United States Patent
Qiao et al.

(10) Patent No.: US 9,523,322 B2
(45) Date of Patent: Dec. 20, 2016

(54) METHOD TO REDUCE ENGINE COMBUSTION AND HARMONIC NOISE FOR MISFIRE DETECTION

(71) Applicant: Continental Automotive Systems, Inc., Auburn Hills, MI (US)

(72) Inventors: Ninsheng Qiao, Troy, MI (US); Marvin L Lynch, Detroit, MI (US); Richard John Gilbert, Livonia, MI (US); Keith Gerlach, Novi, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 550 days.

(21) Appl. No.: 13/715,425

(22) Filed: Dec. 14, 2012

(65) Prior Publication Data

US 2014/0172279 A1    Jun. 19, 2014

(51) Int. Cl.
- *F02D 41/14* (2006.01)
- *F02D 41/00* (2006.01)
- *F02D 41/24* (2006.01)
- *G01M 15/11* (2006.01)

(52) U.S. Cl.
CPC ......... *F02D 41/1498* (2013.01); *F02D 41/009* (2013.01); *F02D 41/2474* (2013.01); *F02D 2200/1015* (2013.01); *G01M 15/11* (2013.01)

(58) Field of Classification Search
CPC . G01M 15/11; F02D 41/1498; F02D 220/025; F02D 220/1015
USPC ............ 701/101, 110, 111, 114; 123/406.13, 123/406.14, 406.24, 407.27, 674; 73/114.08, 73/114.13, 114.26
See application file for complete search history.

(56) References Cited

U.S. PATENT DOCUMENTS

| | | | | |
|---|---|---|---|---|
| 4,646,522 | A * | 3/1987 | Mamiya et al. | 60/602 |
| 4,811,714 | A * | 3/1989 | Akasu | 123/406.29 |
| 5,146,505 | A * | 9/1992 | Pfaff et al. | 381/71.9 |
| 5,531,108 | A * | 7/1996 | Feldkamp et al. | 73/114.05 |
| 5,732,382 | A * | 3/1998 | Puskorius et al. | 701/110 |
| 5,822,710 | A * | 10/1998 | Mezger et al. | 701/110 |
| 5,870,688 | A * | 2/1999 | Kanbara et al. | 701/110 |
| 5,979,406 | A * | 11/1999 | Aoki et al. | 123/406.37 |
| 5,992,386 | A * | 11/1999 | Nytomt et al. | 123/406.37 |
| 6,062,071 | A * | 5/2000 | Henn et al. | 73/114.04 |
| 6,209,519 | B1 * | 4/2001 | Melchior et al. | 123/406.24 |
| 6,427,662 | B2 * | 8/2002 | Tanaya et al. | 123/406.29 |
| 6,457,455 | B2 * | 10/2002 | Baeuerle et al. | 123/406.24 |
| 6,575,136 | B1 * | 6/2003 | Namari | 123/406.58 |
| 6,619,260 | B2 | 9/2003 | Lehner et al. | |
| 7,444,232 | B1 * | 10/2008 | Inada et al. | 701/111 |
| 7,472,687 | B2 * | 1/2009 | Zhu et al. | 123/406.34 |
| 7,798,125 | B2 * | 9/2010 | Barrett et al. | 123/406.37 |
| 7,854,218 | B2 * | 12/2010 | Kapus et al. | 123/435 |
| 2004/0030486 | A1 * | 2/2004 | Sauler et al. | 701/111 |
| 2004/0260453 | A1 * | 12/2004 | Sauler et al. | 701/111 |
| 2005/0033501 | A1 * | 2/2005 | Liu et al. | 701/111 |
| 2005/0234633 | A1 * | 10/2005 | Takemura et al. | 701/111 |
| 2006/0095198 | A1 * | 5/2006 | Damitz et al. | 701/114 |
| 2012/0150414 | A1 * | 6/2012 | Huang | 701/101 |

(Continued)

*Primary Examiner* — John Kwon
*Assistant Examiner* — Johnny H Hoang

(57) ABSTRACT

A method and system for determining combustion and harmonic noise correction factors for current operating conditions corresponding to the actual vehicle and applying the combustion and harmonic noise correction factors to a sensor signal, thereby removing engine combustion and harmonic noise from the sensor signal and leaving a misfire data signal in the sensor signal.

16 Claims, 5 Drawing Sheets

(56) References Cited

U.S. PATENT DOCUMENTS

2012/0191325 A1* 7/2012 Haskara et al. ............. 701/104

* cited by examiner

METHOD TO REDUCE ENGINE COMBUSTION AND HARMONIC NOISE FOR MISFIRE DETECTION

TECHNICAL FIELD

The present disclosure is related generally toward motor vehicle engine controls, and more specifically to a method and system for removing engine combustion and harmonic noise for the purpose of detecting a misfiring cylinder.

BACKGROUND OF THE INVENTION

Internal combustion engines, such as those utilized in motor vehicles, include multiple sensors designed to monitor engine components and allow an engine controller to optimize engine operations for minimum fuel consumption. The sensors transmit sensed data to the engine controller at a certain magnitude. If electrical noise from the engine exceeds that magnitude, the sensor signal can be unreadable by the engine controller.

A typical noise signal originating from an engine is composed of many components from different sources within the engine. The engine harmonic noise is predictable with peaks occurring at specific orders and occurs as a result of both combustion noise and mechanical noise. Some engine harmonic noise arises due to mechanical imbalances such as cylinder to cylinder inertia differences. Combustion noise, however, is driven by imbalances in fueling, intake air, and spark timing factors.

The amplitude of one factor of the engine harmonic noise is proportional to the engine speed, with an increased engine speed directly resulting in an increased amplitude of the harmonic noise. The frequency band of this harmonic noise is at the same harmonic frequency as a paired cylinder misfire pattern. Paired cylinders are the cylinders fired 360 degrees apart (for an even firing engine). The paired cylinder misfire pattern is a cylinder misfire sensor signal used to detect paired engine cylinder misfires. It is also possible for combustion noise patterns that are not completely proportional to speed to overlap with the paired misfire pattern. This relationship between engine speed and the amplitude of engine harmonic noise decreases the signal-noise capability of paired cylinder misfire detection when the engine is operating at high engine speed. In some engine designs, the engine load has a similar affect on the electrical noise to the effect of engine speed.

Some engine controllers utilize crankshaft based misfire detection. Crankshaft based misfire detection employs a digital filter to remove noise from the misfire detection signal and enable misfire signal processing. Since the engine harmonic noise can be at the same frequency as the misfire detection signal, it is impossible for a simple digital filter to remove the engine harmonic noise without removing the paired cylinder misfire signal under standard crankshaft based misfire detection. This is due to the fact that both noise and misfire signal fall within the pass band of the digital filter.

SUMMARY OF THE INVENTION

Disclosed is a method for reducing combustion harmonic noise on a sensor signal having the steps of: determining a set of combustion and harmonic noise correction factors for current operating conditions corresponding to the actual vehicle, and applying the combustion and harmonic noise correction factors to a sensor signal, thereby removing engine combustion and harmonic noise from the sensor signal and leaving a data signal in the sensor signal.

Also disclosed is a vehicle having: an internal combustion engine, an engine controller comprising a memory and a processor, wherein said memory stores instructions operable to cause said engine controller to perform the steps of: determining a combustion and harmonic noise correction factors for current operating conditions corresponding to the actual vehicle, and applying the combustion and harmonic noise correction factors to a sensor signal, thereby removing engine combustion and harmonic noise from the sensor signal and leaving a data signal in the sensor signal.

These and other features of the present invention can be best understood from the following specification and drawings, the following of which is a brief description.

DETAILED DESCRIPTION OF AN EMBODIMENT

Figure 1:
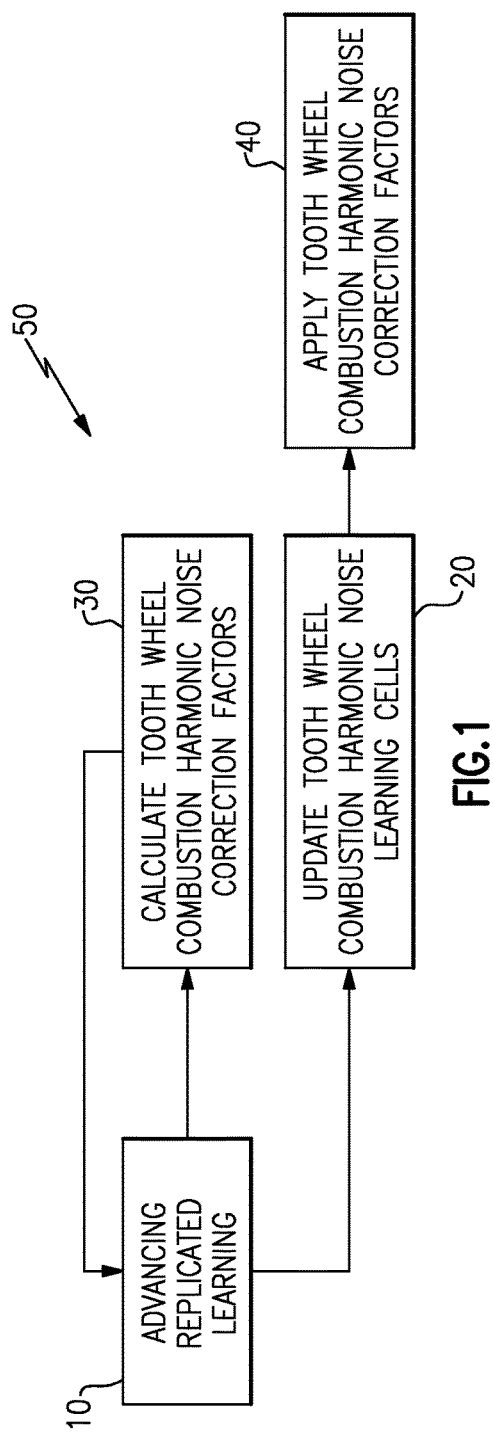
FIG. 1 illustrates flowchart demonstrating a process for learning and applying combustion and harmonic noise correction factors to a misfire detection signal.

A method 50 for reducing or removing combustion and harmonic noise from a cylinder misfire detection signal is illustrated in FIG. 1. Combustion and harmonic noise correction factors are a set of factors, which are directly related to the number of teeth in a flywheel for one engine cycle. In one example, the system is configured as 40 correction factors for a 60-2 tooth flywheel in one engine cycle (20 factors in one engine revolution). The method 50 includes four functions: an advanced replicated learning function 10, a calculate tooth wheel combustion and harmonic noise correction factors function 30, an update tooth wheel combustion and harmonic noise learning factors function 20 and an apply tooth wheel combustion and harmonic noise correction factors function 40.

When learning a set of combustion and harmonic noise correction factors during engine combustion it is possible that the advanced replicated learning function 10 will inadvertently learn the misfire pattern alongside the combustion and harmonic noise pattern. If the misfire pattern is learned, then the corresponding combustion and harmonic noise correction factors will remove the misfire detection signal along with the combustion and harmonic noise resulting in an inability to detect that particular misfire pattern in the future. Learning during engine combustion increases misfire detection capability by applying a learning term to an engine operation region which has a low misfire capability by the process listed as follows: 1) Correction factors are initially learned in a high misfire detection capability region, 2)

These correction factors propagated to low misfire capability regions, 3) The propagated values enable protected learning of the combustion and harmonic noise pattern in that specific region preventing the learning of misfire pattern in the process. By way of example, a typical engine has good misfire capability in a low speed operational region which occurs during engine startup. Misfire detection capability typically decreases as speed and load increase.

Figure 2:
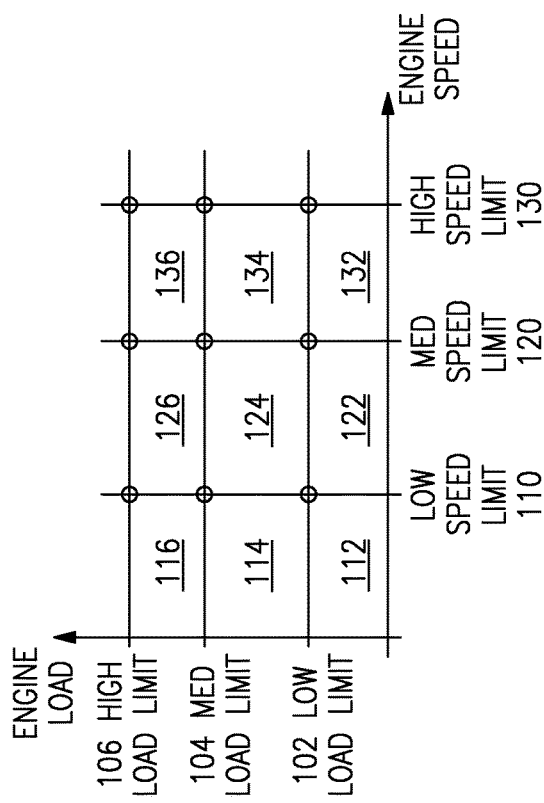
FIG. 2 illustrates a graph showing engine load and engine speed regions of an internal combustion engine.

With continued reference to FIG. 1, FIG. 2 illustrates a graph of engine operation regions split into three load regions 102, 104, 106 and three speed regions 110, 120, 130. By charting the load regions 102, 104, 106 and the three speed regions 110, 120, 130 against each other, the engine operations are divided into nine regions: a low speed/low load region 112, a medium speed/low load region 122, a high speed/low load region 132, a low speed/medium load region 114, a medium speed/medium load region 124, a high speed/medium load region 134, a low speed/high load region 116, a medium speed/high load region 126, and a high speed/high load region 132. Since the amplitude of the engine combustion and harmonic noise increases as the load increases and as the speed increases, the low speed/low load region 112 of engine operations has a minimal amount of combustion and harmonic noise, allowing the misfire pattern to be easily identified and separated from the combustion harmonic noise. Thus, the low speed/low load region 112 provides an ideal initial learning region.

Once the learning has occurred in the region where the misfire pattern can be easily identified (the initial learning region), the calculate tooth wheel combustion and harmonic noise correction factors (function 30) calculates correction factors that remove the combustion and harmonic noise from the system process input signal. The update tooth wheel combustion and harmonic noise learning (function 20) then updates the stored data with the newly learned correction factors, and allows the apply tooth wheel combustion harmonic-noise correction factors (function 40) to remove combustion and harmonic noise from the incoming system process input signal.

Once the correction factors for the initial learning region (the low speed/low load region 112) are determined, the advancing replicated learning (function 10) can apply the determined correction factors to an adjacent region and remove most of the combustion harmonic noise from the adjacent region (the low speed/medium load region 114 or the medium speed/low load region 122). Once the adjacent region has had a majority of the combustion harmonic noise removed, the adjacent region becomes a learning region, and the process can be reiterated when learning conditions are met.

Figure 3:
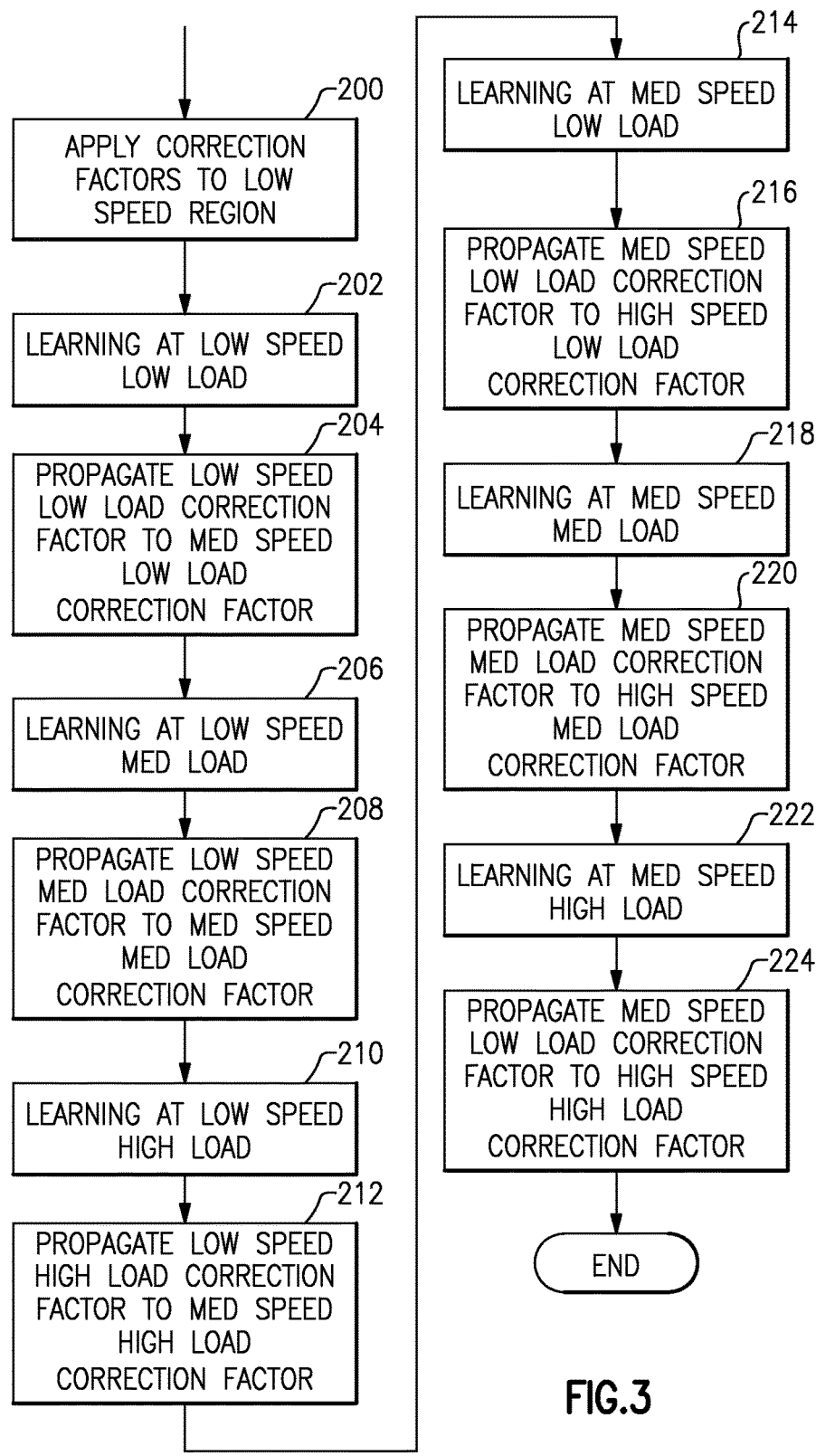
FIG. 3 illustrates a flowchart of a process by which combustion and harmonic noise correction factors are learned.

The update tooth wheel combustion and harmonic noise learning factors function (Function 20), described above with regards to FIG. 1, controls the database data updating and is described in greater detail in the process illustrated in FIG. 3. Combustion and harmonic noise correction factors are stored in a non-volatile memory database. The database contains all sets of values of combustion and harmonic noise correction factors over all speed and load regions. In a system that has not undergone learning (e.g., a brand-new controller) all region values are initialized to a generic value, such as 1. Updating the tooth wheel combustion and harmonic noise learning in the correction factors database is based on a combination of both engine speed oriented and engine load oriented replicated engine operational region propagation.

Figure 4:
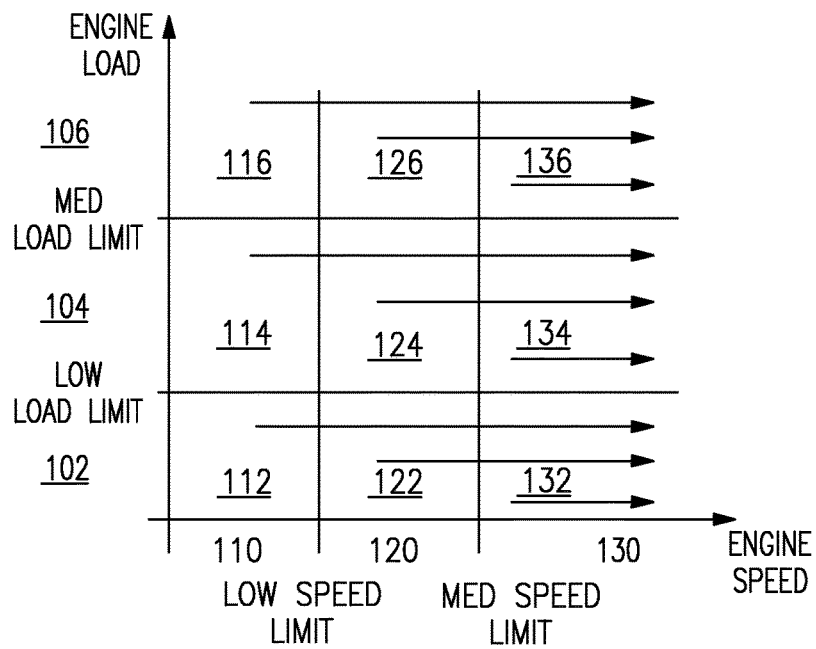
FIG. 4 illustrates engine speed based correction factors propagation for utilization in the process of FIG. 3.
Figure 5:
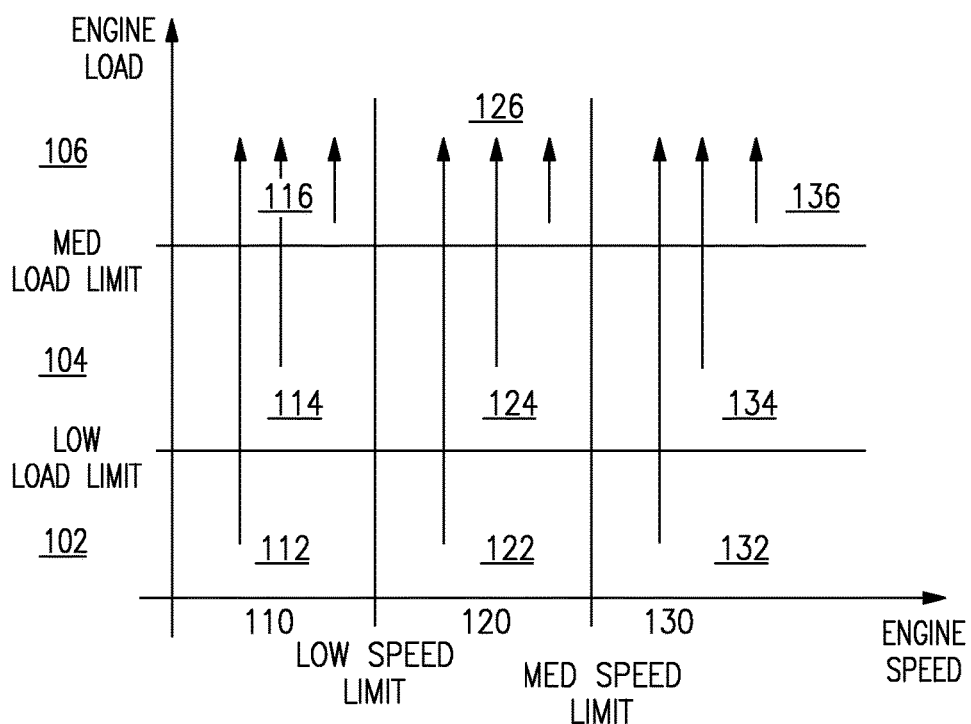
FIG. 5 illustrates engine load based correction factors propagation for utilization in the process of FIG. 3.

In one example, at the first time the learning conditions of the low speed/low load region 112 are met, the values of the correction factors database are calculated, and also propagated to the corresponding to the medium speed/low load region 122, and the corresponding to the high speed/low load region 132 if the propagation is engine speed oriented (FIG. 4). Similarly the value is propagated to the correction factors database s corresponding to the low speed/medium load region 114, and low speed/high load region 116 in an engine load orientated propagation scheme (FIG. 5).

Once the combustion and harmonic noise correction factors in the low speed/medium load region 114 have been updated, the resulting values are propagated to the correction factors database as corresponding to the medium speed/medium load region 124, and high speed/medium load region 134. This kind of advancing replicated propagation process continues until each set of the correction factors in the database has been updated.

FIG. 3 illustrates the process by which a set of combustion and harmonic-noise correction factors are learned for each of the regions in the advancing replicated learning (function 10), the calculate tooth wheel combustion and harmonic noise correction factors (function 30), and the update tooth wheel combustion harmonic noise learning s (function 20) of FIG. 1 in greater detail. Initially, the process applies a set of stored correction factors to the low speed/low load region 112 in an "apply correction factors to low speed region" (step 200). Once the preloaded correction factors are applied, the process determines an accurate correction factors specific to the engine in a "learning at low speed/low load" (step 202) using the calculate tooth wheel combustion and harmonic noise correction factors (function 30) of FIG. 1. Once the correction factors for the low speed/low load region 112 are determined, the correction factors are stored in correction factors database as corresponding to the low speed/low load correction factors. The process then propagates the correction factors from the low speed/low load region 112 to a medium speed/low load region 124 in a "propagate low speed/low load correction factor to medium speed/low load correction factor" (step 204).

The controller then utilizes a similar process to determine accurate correction factors for the low speed/medium load region 114 based on initial pre-stored correction factors in a "learning at low speed/medium load" (step 206), and propagates the low speed/medium load correction factors to a medium speed/medium load region of the correction factors database in a "propagate low speed medium load correction factor to medium speed medium load correction factor" (step 208). Once the correction factors for the low speed/medium load region 114 have been determined, the controller utilizes a similar process to determine an accurate correction factors for the low speed/high load region 116 in a "learning at low speed/high load" (step 210). Once the correction factors for the low speed/high load region 116 have been determined, the correction factors are propagated to the medium speed/high load region of the correction factors database in a "propagate low speed/high load correction factor to medium speed/high load correction factor" (step 212).

Steps 200-210 determine the initial correction factors for the low speed regions 110 of the engine operations. This determination is possible because at low speeds, the combustion and harmonic noise has a low enough magnitude that the cylinder misfire detection signal is not drowned out by the engine combustion and harmonic noise. Once the initial correction factors are determined, the calculate tooth wheel combustion harmonic noise correction factors (function 30) are performed in the medium speed/low load region 122 using the previously stored correction value from (step 204) in a "learning at medium speed/low load" (step 214). The accurate medium speed/low load correction factors are then propagated to the in the correction factors database corresponding to the high speed/low load region 132 in a "propagate medium speed/low load correction factors to high speed/low load correction factors" (step 216).

A similar process is utilized to propagate the medium speed/medium load correction factors to the high speed/medium load region 134 in the "learning at medium speed/medium load" (step 218) and the "propagate medium speed/medium load correction factors to high speed/medium load correction factors" (step 220) and to propagate the medium speed/high load correction factors to the high speed/high load region 136 in the "learning at medium speed/high load" (step 222) and the "propagate medium speed/high load correction factors to high speed/high load correction factors" (step 224).

FIG. 4 graphically illustrates the propagation of the correction factors as a result of the process outlined in FIG. 3, with each set of the initial correction factors being iteratively propagated from the low speed region 110 up to the high speed region 130. In alternate configurations, such as the graphical propagation illustration shown in FIG. 5, the initial correction factors can be defined for each speed region 110, 120, 130 and propagated up through the load limit regions 102, 104, 106. The alternate example propagation is utilized in an engine where the noise generated by the engine load outweighs the noise resulting from engine speed.

Figure 6:
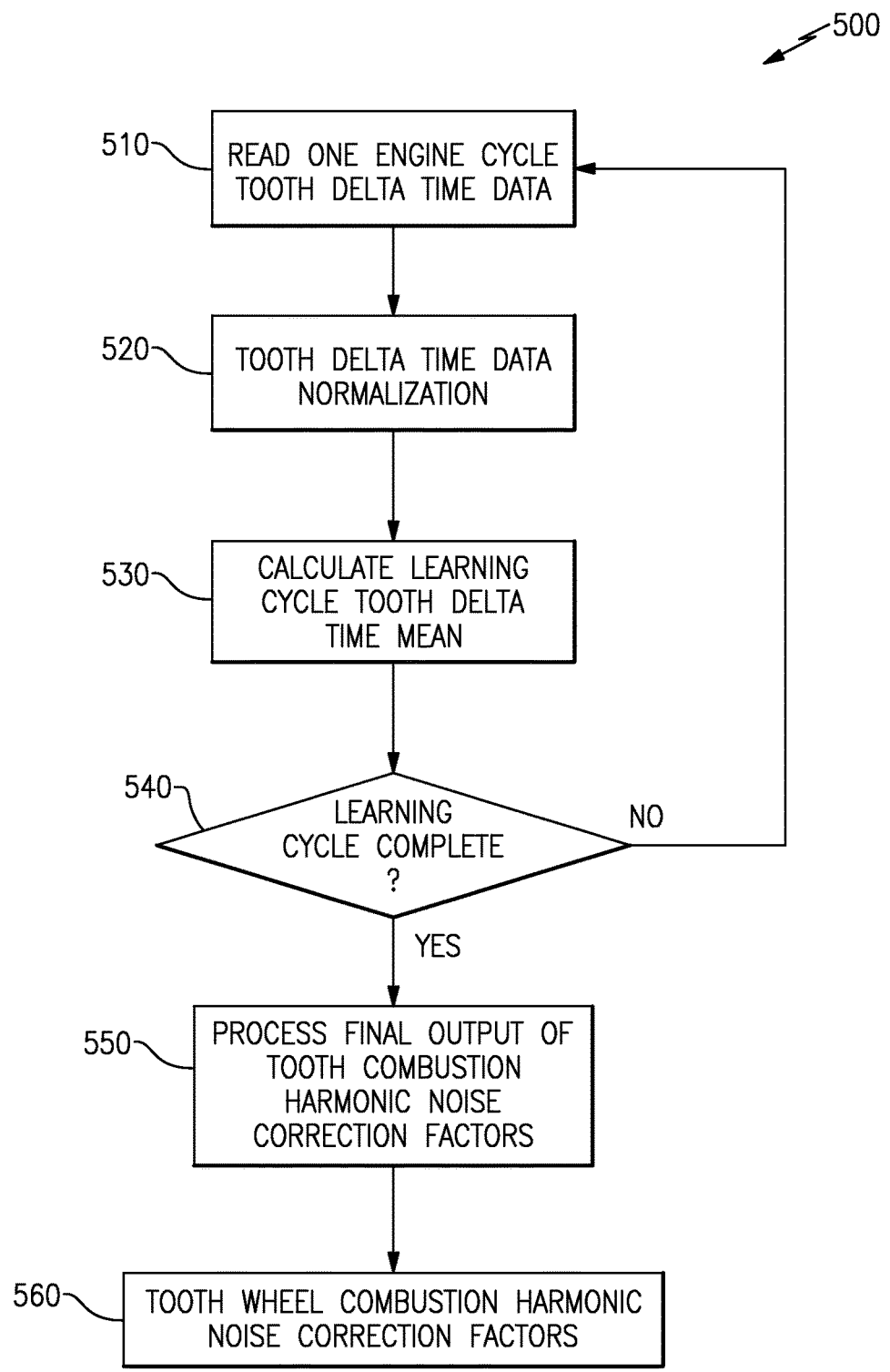
FIG. 6 illustrates a flowchart of a process for determining combustion and harmonic noise correction factors at a given speed and load limit.

FIG. 6 illustrates a set of correction factors determination process 500 by which the calculate tooth wheel combustion-harmonics noise correction factors (function 30) determines correction factors for the specific engine at the current engine speed/engine load region.

Initially, an engine controller utilizes crank tooth signal processing with a currently stored correction factors to read one engine cycle's worth of tooth delta time data from a flywheel in a "read one engine cycle tooth delta time data" (step 510). The correction factors utilized in this step is either a default low speed/low load region 112 correction factors if the engine is initially starting up, or correction factors that have been propagated into the currently operating engine speed/engine load regions 114, 116, 122, 124, 126, 132, 134, 136 via the process described with regards to FIG. 3. A typical flywheel is designed such that two revolutions of the flywheel is equivalent to one complete engine cycle.

Once a calibrated number of engine cycles has been completed, the controller normalizes the tooth delta time data in a "tooth delta time data normalization" (step 520). The tooth delta time is the time period that elapses between a sensor detecting a flywheel tooth and the sensor detecting an adjacent flywheel tooth. The delta time value is normalized by dividing each delta time value by the sum of all the delta time values. The normalization of the delta time values ensures that every delta time value is within the range of 0-2, and enables later calculations by the engine controller.

After determining a normalized delta time value for each tooth, the engine controller determines a mean normalized delta time value for the current operating conditions in a "calculate learning cycle tooth delta time mean" (step 530). The mean normalized delta time value is determined by summing the normalized delta time values and dividing by the number of delta time values. The normalized tooth delta time mean includes the normalized delta time values of all the previous iterations of steps 510-530 of the correction factors determination process 500.

The tooth wheel combustion-harmonics noise correction factors (function 30) then checks to see if the learning cycle is complete in an "is learning cycle complete" (step 540). A typical implementation of the correction factors determination process 500 iterates steps 510, 520 and 530 multiple times, with a greater number of learning iterations resulting in a greater robustness of the determined correction factors. The process 500 can check whether the learning cycle is complete by incrementing a counter each time the "is learning cycle complete" (step 540) is entered, and comparing the counter to a threshold set at the desired number of iterations. If the counter is equal to the threshold, the controller determines that the learning cycle is complete and proceeds to the next step. If the counter is less than the threshold, the controller determines that the learning cycle is not complete and the process returns to the read one engine cycle tooth delta time data step 510.

Once the learning cycle is complete, the controller processes the final output of the learning cycle in a "process final output of tooth combustion harmonic noise correction factors" (step 550). In order to remove the harmonic noise from the cylinder misfire detection signal, the signal is divided by the correction factors. To facilitate this mathematical operation, the determined correction factors is inverted in the process final output of tooth combustion harmonic noise correction factors (step 550). The cylinder misfire detection signal can then be multiplied by the inverted correction factors resulting in the mathematical equivalent of dividing the system process input signal by the correction factors.

The correction factors determination process 500 then outputs the final tooth wheel combustion and harmonic noise correction factors to the engine controller, which utilizes them in the apply tooth wheel combustion and harmonic noise correction factors (function 40) to remove the combustion and harmonic noise from the cylinder misfire detection signal.

Figure 7:
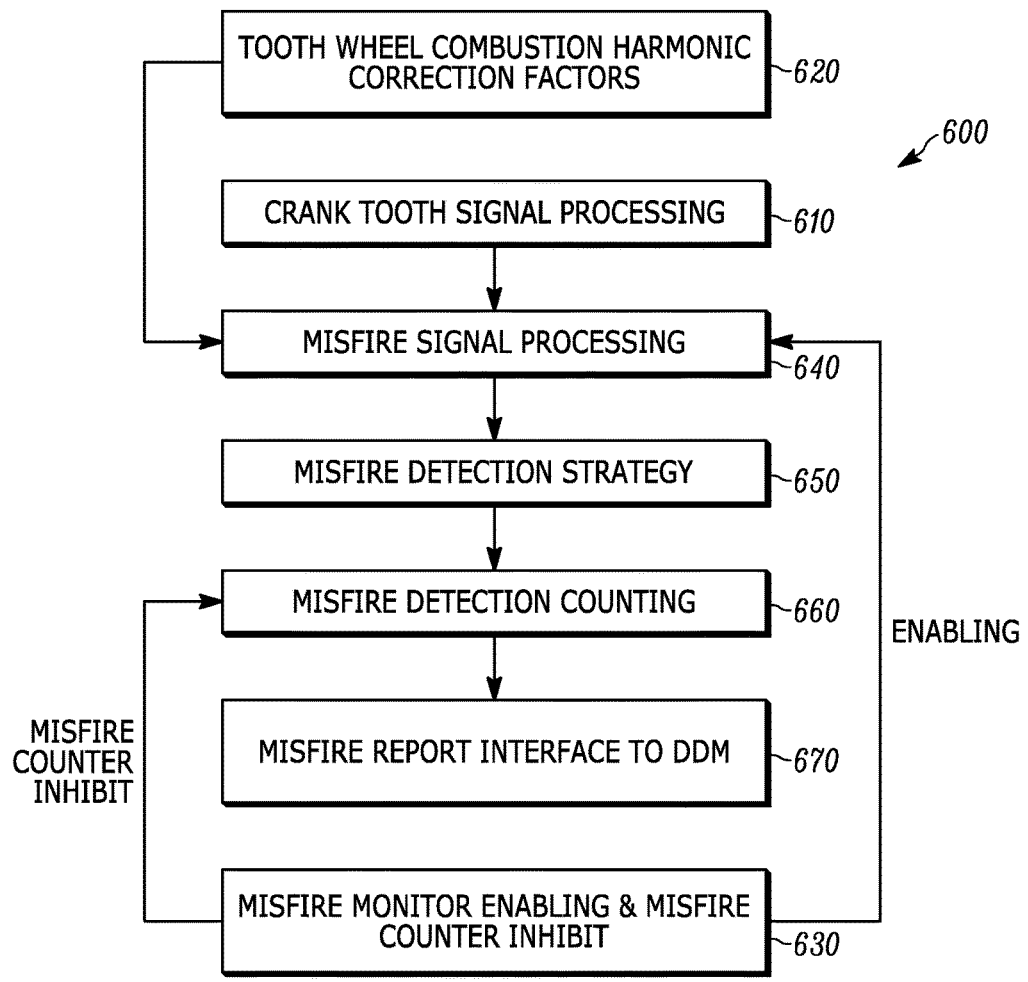
FIG. 7 illustrates a flowchart of a cylinder misfire protection process.

FIG. 7 illustrates a cylinder misfire detection process 600 implemented by the apply tooth wheel combustion and harmonic noise correction factors (function 40). Initially, the controller receives a raw crank tooth signal and processes the crank tooth signal according to standard processing techniques to determine a raw cylinder misfire signal in a "crank tooth signal processing" (step 610). The controller then determines an appropriate tooth wheel combustion and harmonic correction factors from a database of determined correction values based on the current operating conditions of the vehicle engine in a "determine combustion harmonic correction factors" (step 620). The engine controller simultaneously, or approximately simultaneously, enables a misfire monitor in a "misfire monitor enabling and misfire counter inhibit" (step 630).

The engine controller then processes the raw misfire signal by using the combustion and harmonic correction factors determined in the determine tooth wheel combustion harmonic correction factors (step 620) to remove the combustion harmonic patterns from the cylinder misfire signal, thereby removing a significant portion of the engine noise in a "misfire signal processing" (step 640).

The controller then determines whether a cylinder misfire has occurred in a "misfire detection strategy" (step 650) using known misfire detection techniques. When a cylinder misfire is detected, the cylinder misfire detection process 600 increments a counter in a "misfire detection counting" (step 660), and the total number of cylinder misfires (the counter value) is conveyed to the engine controller via a misfire report interface in the "misfire report interface" (step 670). The engine controller can then take any necessary actions to account for the cylinder misfire rate and thereby increases the fuel efficiency.

While the above disclosure describes a system utilizing only three engine speed ranges and three engine load ranges, it is understood that the system can be modified to accommodate additional speed ranges and additional load ranges by expanding the chart illustrated in FIG. 2 without significant alteration and still fall within the above disclosure. It is further understood that alternate engine conditions beyond engine speed or engine load can be included by adapting the engine operating conditions chart illustrated in FIG. 2 to include additional axis resulting in a multi-dimensional array and still fall within the above disclosure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method to reduce engine combustion and harmonic noise for misfire detection on a sensor signal in a vehicle comprising the steps of:
    determining by an engine controller combustion and harmonic noise correction factors for current operating conditions of an engine corresponding to the vehicle;
    applying by the engine controller the combustion and harmonic noise correction factors to the sensor signal, the applying comprising dividing the sensor signal by the combustion and harmonic noise correction factors to remove engine combustion and harmonic noise from the sensor signal and leave a misfire data signal in the sensor signal;
    wherein the combustion noise correction factors relate to corrections due to imbalances in one or more of fueling, intake air, and spark timing factors of the internal combustion engine;
    wherein said step of determining combustion and harmonic noise correction factors corresponding to the actual vehicle uses an advanced replicating learning process to determine said correction factors;
    wherein said advanced replicating learning process comprises the steps of:
    determining new correction factors for said sensor signal in an initial learning region of engine operating conditions;
    propagating said new correction factors for said sensor signal to an adjacent learning region adjacent to said initial learning region as learning correction factors;
    using said learning correction factors to remove a portion of combustion and harmonic noise from said sensor signal when said engine begins operating in the adjacent learning region, thereby allowing a controller to isolate a misfire data signal and a noise signal from said sensor signal and to determine a new correction factors for said sensor signal in said adjacent engine operating region of said engine based on said data signal and said noise signal; and
    repeating the steps of propagating said new correction factors for said sensor signal to an adjacent learning region adjacent to said initial learning region as learning correction factors and using said learning correction factors to remove a portion of combustion and harmonic noise from said sensor signal when said engine begins operating in the adjacent learning region, thereby allowing a controller to isolate a misfire data signal and a noise signal from said sensor signal and to determine a new correction factors for said sensor signal in said adjacent engine operating region of said engine based on said data signal and said noise signal until correction factors corresponding to the actual vehicle are learned for each operating condition of the vehicle.

2. The method of claim 1, wherein said step of propagating said new correction factors for said sensor signal to an adjacent learning region adjacent to said previous learning region as learning correction factors comprises propagating said correction factors from an initial low engine speed region through to a final high engine speed region.

3. The method of claim 1, wherein said step of propagating said new correction factors for said sensor signal to an adjacent learning region adjacent to said previous learning region as a learning correction factors comprises propagating said correction factors from an initial low engine load region through to a final high engine load region.

4. The method of claim 3, wherein said step of propagating said new correction factors for said sensor signal to an adjacent learning region adjacent to said previous learning region as a learning correction factors further comprises propagating said correction factors from an initial low engine speed region through to a final high engine speed region.

5. The method of claim 1, wherein said step of determining a new correction factors for said sensor signal in said adjacent engine operating region of said engine based on said data signal and said noise signal comprises the steps of:
    reading an engine cycle tooth delta time data set;
    normalizing a tooth delta time from said engine cycle tooth delta time data set to create a normalized tooth delta time data set;
    calculating a learning cycle tooth normalized delta time mean using said normalized tooth delta time data set, thereby determining combustion and harmonic noise correction factors for said sensor signal.

6. The method of claim 5, wherein said steps of reading an engine cycle tooth delta time data set and normalizing a tooth delta time from said engine cycle tooth delta time data set to create a normalized tooth delta time data set are reiterated through multiple engine cycles and said step of calculating a learning cycle tooth normalized delta time mean using said normalized tooth delta time data set, thereby determining combustion and harmonic noise correction factors for said sensor signal is performed using data from multiple engine cycles, thereby determining a more robust combustion and harmonic correction factors.

7. The method of claim 5, further comprising the step of inverting the determined combustion and harmonic correction factors, thereby allowing the controller to divide an incoming sensor signal by multiplying inverted correction factors which are combustion and harmonic correction factors.

8. A method to reduce engine combustion and harmonic noise for misfire detection on a sensor signal in a vehicle comprising the steps of:
    determining by an engine controller combustion and harmonic noise correction factors for current operating conditions of an engine corresponding to the vehicle;
    applying by the engine controller the combustion and harmonic noise correction factors to the sensor signal, the applying comprising dividing the sensor signal by the combustion and harmonic noise correction factors to remove engine combustion and harmonic noise from the sensor signal and leave a misfire data signal in the sensor signal;

wherein the combustion noise correction factors relate to corrections due to imbalances in one or more of fueling, intake air, and spark timing factors of the internal combustion engine;

wherein said step of applying the combustion and harmonic noise correction factors to a sensor signal, thereby removing engine combustion and harmonic noise from the sensor signal and leaving a misfire data signal in the sensor signal further comprises:

the engine controller receiving a raw sensor signal; and
applying by the engine controller said determined correction factors to said raw sensor signal by dividing said raw sensor signal by said correction factors, thereby removing engine combustion and harmonic noise from said correction factors and leaving a clean data signal.

9. A vehicle comprising:
an internal combustion engine;
an engine controller comprising a memory and a processor, wherein said memory stores instructions operable to cause said engine controller to perform the steps of:
determining a combustion and harmonic noise correction factors for current operating conditions corresponding to the vehicle using an advanced replicated learning process;
applying the combustion and harmonic noise correction factors to a sensor signal, the applying comprising dividing the sensor signal by the combustion and harmonic noise correction factors to remove engine harmonic noise from the sensor signal and leave a data signal in the sensor signal;
wherein the combustion noise correction factors relate to corrections due to imbalances in one or more of fueling, intake air, and spark timing factors of the internal combustion engine;
wherein said advanced replicating learning process comprises the steps of:
determining a new correction factors for said sensor signal in an initial learning region of engine operating conditions;
propagating said new correction factors for said sensor signal to an adjacent learning region adjacent to said initial learning region as a set of learning correction factors;
using said learning correction factors to remove a portion of combustion and harmonic noise from said sensor signal when said engine begins operating in the adjacent learning region, thereby allowing the engine controller to isolate a misfire data signal and a noise signal from said sensor signal and to determine a new correction factors for said sensor signal in said adjacent engine operating region of said engine based on said data signal and said noise signal; and
repeating the steps of propagating said new correction factors for said sensor signal to an adjacent learning region adjacent to said initial learning region as learning correction factors and using said learning correction factors to remove a portion of combustion and harmonic noise from said sensor signal when said engine begins operating in the adjacent learning region, thereby allowing the engine controller to isolate a misfire data signal and a noise signal from said sensor signal and to determine new correction factors for said sensor signal in said adjacent engine operating region of said engine based on said data signal and said noise signal until correction factors corresponding to the actual vehicle are learned for each operating condition of the vehicle.

10. The vehicle of claim 9, wherein said step of propagating said new correction factors for said sensor signal to an adjacent learning region adjacent to said previous learning region as learning correction factors comprises propagating said correction factors from an initial low engine speed region through to a final high engine speed region.

11. The vehicle of claim 9, wherein said step of propagating said new correction factors for said sensor signal to an adjacent learning region adjacent to said previous learning region as learning correction factors comprises propagating said correction factors from an initial low engine load region through to a final high engine load region.

12. The vehicle of claim 11, wherein said step of propagating said new correction factors for said sensor signal to an adjacent learning region adjacent to said previous learning region as learning correction factors further comprises propagating said correction factors from an initial low engine speed region through to a final high engine speed region.

13. The vehicle of claim 9, wherein said step of determining new correction factors for said sensor signal in said adjacent engine operating region of said engine based on said data signal and said noise signal comprises the steps of:
reading an engine cycle tooth delta time data set;
normalizing a tooth delta time from said engine cycle tooth delta time data set to create a normalized tooth delta time data set;
calculating a learning cycle tooth normalized delta time mean using said normalized tooth delta time data set, thereby determining a harmonic noise correction factors for said sensor signal.

14. The vehicle of claim 13, wherein said steps of reading an engine cycle tooth delta time data set and normalizing a tooth delta time from said engine cycle tooth delta time data set to create a normalized tooth delta time data set are reiterated through multiple engine cycles and said step of calculating a learning cycle tooth normalized delta time mean using said normalized tooth delta time data set, thereby determining combustion and harmonic noise correction factors for said sensor signal is performed using data from all of said engine cycles, thereby determining a more robust combustion and harmonic correction factors.

15. The vehicle of claim 13, further comprising the step of inverting the determined combustion and harmonic correction factors, thereby allowing the controller to divide an incoming sensor signal by multiplying by the inverted correction factors which are combustion and harmonic correction factors.

16. A vehicle comprising:
an internal combustion engine;
an engine controller comprising a memory and a processor, wherein said memory stores instructions operable to cause said engine controller to perform the steps of:
determining a combustion and harmonic noise correction factors for current operating conditions corresponding to the vehicle using an advanced replicated learning process;
applying the combustion and harmonic noise correction factors to a sensor signal, the applying comprising dividing the sensor signal by the combustion and harmonic noise correction factors to remove engine harmonic noise from the sensor signal and leave a data signal in the sensor signal;

wherein the combustion noise correction factors relate to corrections due to imbalances in one or more of fueling, intake air, and spark timing factors of the internal combustion engine;

wherein said step of applying the combustion and harmonic noise correction factors to a sensor signal, thereby removing engine combustion and harmonic noise from the sensor signal and leaving a data signal in the sensor signal further comprises:

the engine controller receiving a raw sensor signal; and applying by the engine controller said determined correction factors to said raw sensor signal by dividing said raw sensor signal by said correction factors, thereby removing engine combustion and harmonic noise from said correction factors and leaving a clean data signal.

* * * * *